July 24, 1923.
C. H. SCHURR
1,462,985
GEAR GRINDING APPARATUS
Filed March 23, 1922   2 Sheets-Sheet 1
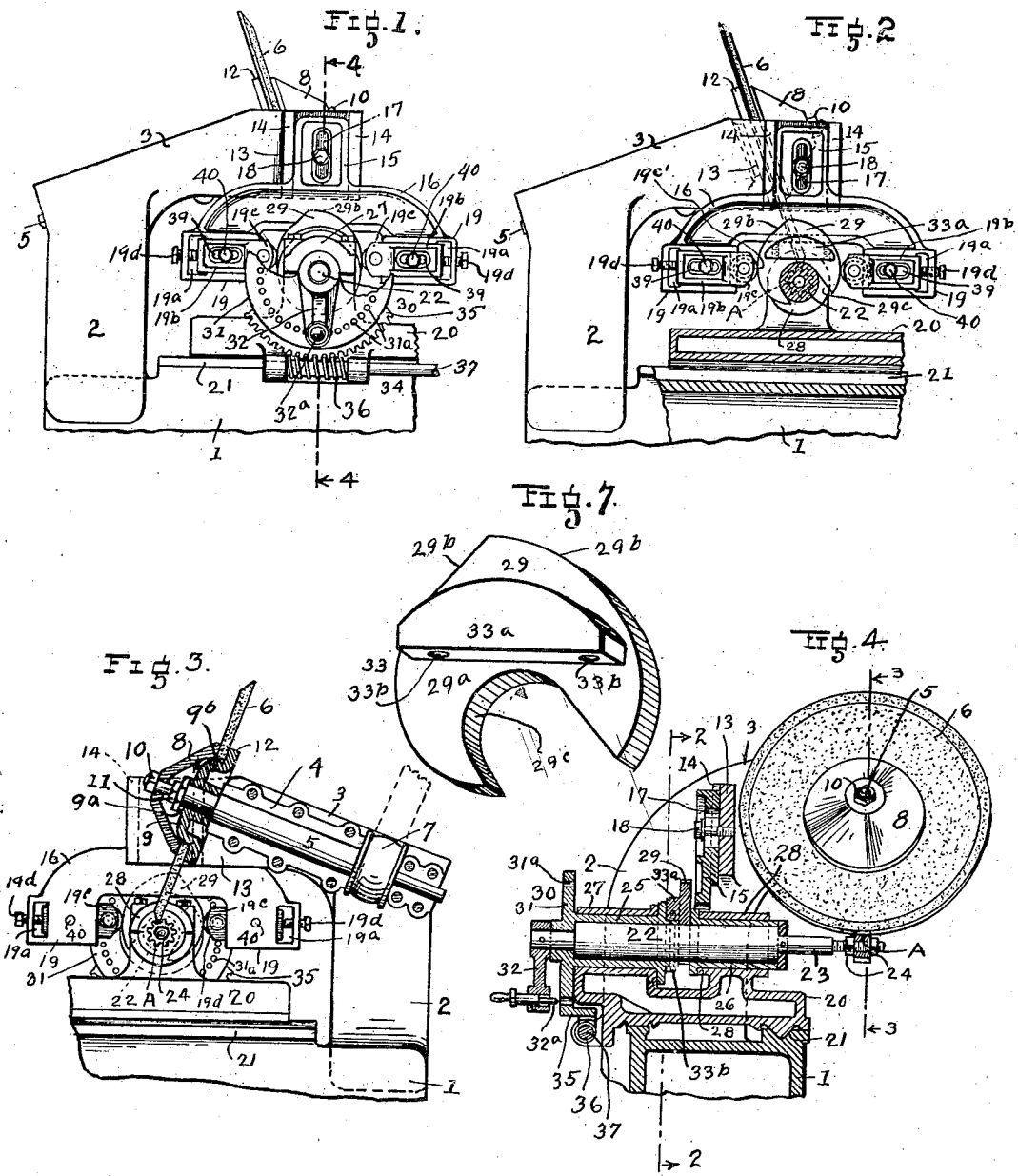
Inventor
Charles H. Schurr
By Geo. B. Pitts
Attorney July 24, 1923.
C. H. SCHURR
GEAR GRINDING APPARATUS
Filed March 23, 1922
1,462,985
2 Sheets-Sheet 2
Fig. 5.
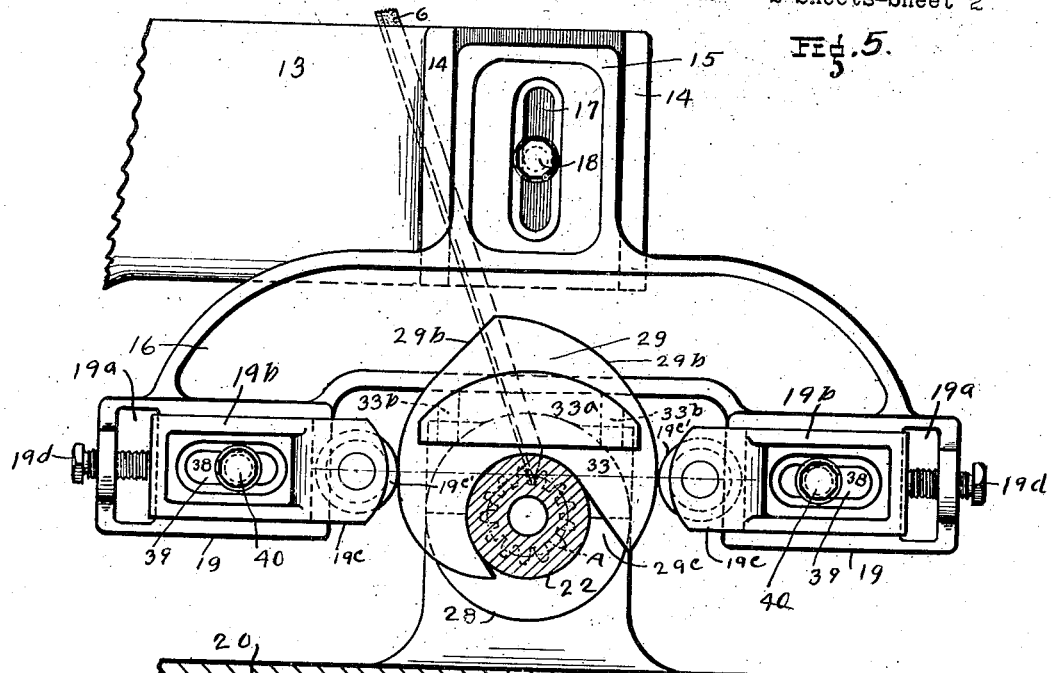
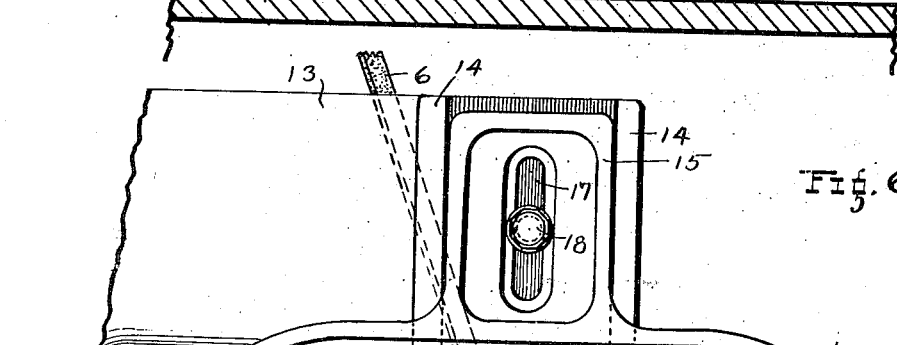
Fig. 6.
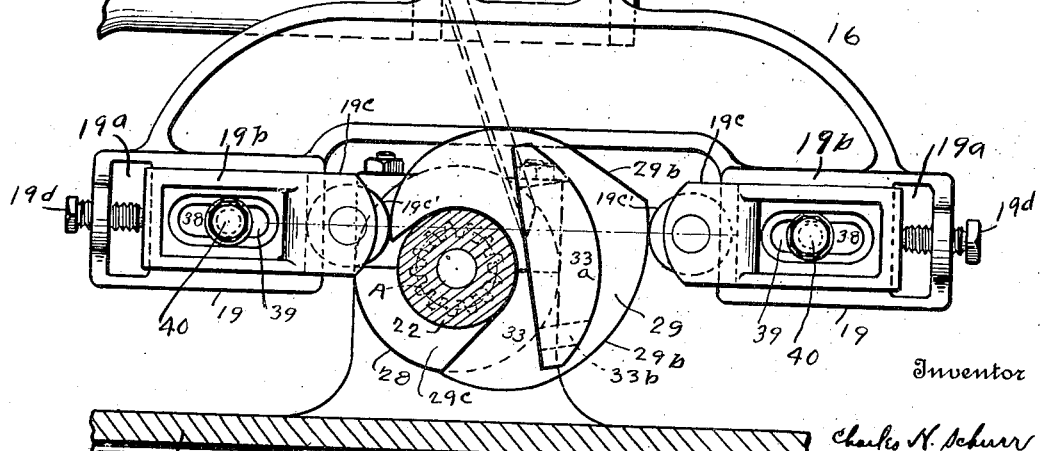
Inventor
Charles H. Schurr
By
Geo. A. Pitts
Attorney Patented July 24, 1923.

1,462,985

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

GEAR-GRINDING APPARATUS.

Application filed March 23, 1922. Serial No. 546,076.

*To all whom it may concern:*

Be it known that I, CHARLES H. SCHURR, a citizen of the United States, residing at Cleveland, county of Cuyahoga, and State of Ohio, have invented certain new and useful Improvements in and Relating to Gear-Grinding Apparatus, of which the following is a specification.

This invention relates to an apparatus for grinding or surfacing gear teeth. As illustrating the preferred application of my invention, I have shown it as adapted for grinding gear teeth which have been generated according to the involute system.

One object of the invention is to provide a machine of this character of relatively few parts, capable of co-operation to accurately finish or grind gear teeth.

Another object of the invention is to provide an improved machine of relatively simple construction, whereby assembly and replacement of elements for adapting the machine to different sized gears may be readily and easily effected.

Another object of the invention is to provide a gear grinding apparatus wherein novel means are provided for translating the rotary movement of the work spindle into bodily movement thereof to effect movement of the gear tooth relative to the tool.

Other objects of the invention will be apparent to those skilled in the art to which my invention relates from the following description taken in connection with the accompanying drawings, wherein—

Fig. 1 is a fragmentary elevational view of an apparatus embodying my invention.

Fig. 2 is a view similar to Fig. 1, but partly in section, substantially on the line 2—2 of Fig. 4.

Fig. 3 is a section on the line 3—3 of Fig. 4.

Fig. 4 is a section on the line 4—4 of Fig. 1.

Fig. 5 is a view substantially similar to Fig. 2, but enlarged.

Fig. 6 is a view similar to Fig. 5, but showing certain of the elements in the position to which they are moved during operation.

Fig. 7 is a perspective view of the cam device.

In the drawings, 1 indicates a frame or bed of any desired construction, for example, such as shown in Patent No. 1,390,145, dated Sept. 6, 1921, and granted to Ernest J. Lees. 2 indicates a standard carried by the frame 1. The standard 2 may be provided with an arm 3, having bearings 4 for a shaft 5. 6 indicates a tool, such as an abrading wheel, secured to the shaft 5 and driven by any suitable means, for example, a pulley 7, driven by a belt (see dotted lines in Fig. 3). The arm 3 is preferably arranged at the desired angle to dispose the abrading surface of the tool 6 at the proper angle of obliquity, but such arm may be mounted for adjustment in any well known manner to arrange the tool at different angles of obliquity as desired; likewise, the standard 2 may be mounted for adjustment vertically in any well known manner as is customary in machines of this character; in fact, the construction and adjustable mechanism for the arm 3 and standard 2 may be similar to that disclosed in the aforesaid patent, if desired.

The tool 6 preferably comprises an annular disk, the abrading or cutting surface of which may be trued by suitable mechanism (not shown). The disk 6 may be of relatively large diameter so as to extend across the tooth surface. The shaft 5 preferably extends beyond the outer end of the bearing 4 and carries a pair of clamping members 8, 9, between which the tool 6 is fixed by a nut 10, engaging the free end of the shaft 5. The shaft 5 may be reduced to form a shoulder against which the hub 9$^a$ of the inner clamping member 9 is secured by a nut 11. The clamping member 9 is preferably provided with an inwardly extending wall 9$^b$ and a flange 12 which form a suitable seat for the abrading or cutting disk or tool 6.

13 indicates a bracket extending laterally from the standard 2 and provided at or near its outer end with a pair of vertically arranged guide walls 14 to receive and adjustably support the arm 15 of an abutment carrying member 16. The arm 15 is formed with an elongated slot 17. 18 indicates a suitable clamping device, such as a bolt, which extends through the slot 17 and engages a screw threaded opening in the bracket 13 and, when tightened, serves to secure or clamp the arm 15 to the bracket 13, but when such bolt is loosened, the arm may be adjusted vertically. The abutment carrying member 16 preferably comprises a yoke member, as I prefer to provide two spaced abutments 19, to which reference later will be made. The yoke member extends laterally to either side of the arm 15, its outer or free ends depending downwardly and serving as, or supports for, the spaced abutments 19.

20 indicates a slide mounted in suitable ways 21, provided on the frame 1, whereby the slide may be reciprocated in the manner to be later set forth. 22 indicates a work spindle rotatably mounted on the slide 20. The work spindle 22 is extended beyond the slide 20, as shown at 23, and such extended end may be reduced and provided with screw threads to receive nuts 24, between which the work piece or gear A is clamped in operative relation to the tool 6. The spindle 22 is preferably rotatably mounted in a pair of sleeves 25, 26, which in turn rotatably fit bearings 27, 28, respectively, provided on the slide 20. The bearings are preferably spaced from each other to permit the provision between them of a cam device 29 co-operable with the abutments 19 in the manner to be later set forth. During the operation of the apparatus to grind one side of each tooth of the gear A, the cam device 29 has fixed relationship to the spindle 22, but to permit indexing of the gear A between the grinding of successive teeth by an indexing mechanism indicated as an entirety at 30, the cam device 29 is secured to the sleeve 25, so that the spindle 22 and gear A may be indexed or rotated relative thereto.

The indexing mechanism 30 may be of any desired construction, that shown for illustrative purposes comprising a disk 31 provided on the sleeve 25 and formed with an annular series of openings 31$^a$ and a crank arm 32 fixed to the outer end of the shaft or spindle 22 and carrying a pin 32$^a$, which may be actuated successively to project into and be removed from the openings 31$^a$, whereby the disk and crank arm may be locked together and then unlocked to permit indexing.

The cam device 29, when constructed for co-action with spaced abutments, comprises a body portion 29$^a$ shaped along its edges or end walls to provide a pair of cam surfaces 29$^b$ which are disposed between and in co-acting engagement with the abutments 19. The body portion 29$^a$ is formed with a slot 29$^c$, extending inwardly from one edge between the cam surfaces so that the cam device may fit over the work spindle and be removably secured to the projecting end of the sleeve 25 by means indicated as an entirety at 33. The securing means may comprise a lug 33$^a$ formed integrally with and disposed on one face of the body portion 29$^a$ and arranged to engage a flat surface provided on the inner end of the sleeve 25, to which flat surface the lug 33$^a$ may be detachably secured by a plurality of cap screws 33$^b$ each extending through aligned openings formed in the lug and sleeve end and engaging threads formed in the openings in the latter; this arrangement permitting of the removal of one cam device and the substitution of another cam device to accommodate the apparatus to different sized gears A.

34 indicates as an entirety means for rotating the spindle 22 in opposite directions. Of the rotating means 34, 35 indicates a worm segment, formed integrally with or connected to the disk 31 in any well known manner. 36 indicates a worm meshing with the worm segment 35. 37 indicates a shaft to which the worm 36 is fixed. The shaft 37 has bearings in suitable lugs which may be formed integrally with the slide 20. The shaft 37 is rotated first in one direction and then in the other direction by any desired mechanism, or by the reversing mechanism shown and described in the aforesaid patent No. 1,390,145.

In the construction herein disclosed I oscillate the work spindle 22 about its axis; the spindle 22 in turn moves the cam device 29. During movement of the cam device with the spindle 22, the cam surfaces 29$^b$ co-act with the abutments 19, which, being fixed in spaced relationship, will cause the reciprocation of the slide 20 on its ways 21. In Fig. 5, the spindle 22 and cam device 29 are shown in a neutral position; rotation of the shaft 37 in one direction will cause the spindle 22 and cam device 29 to move counterclockwise to one extreme position, so that a rolling movement is imparted to the gear A in one direction; then the rotation of the shaft 37 in the reverse direction will cause the spindle 22 and cam device 29 to move clockwise, thereby causing the cam device and abutments 19 to effect rectilinear movement of the slide to its other extreme position (see Fig. 6), so that a rolling movement is imparted to the gear A in the opposite direction.

It will be noticed from the drawings that the abutments 19 are disposed at opposite sides of the work piece or gear A and in a plane that is tangent to the pitch circle thereof and that the points of contact or engagement of the cam surfaces 29$^b$ with the abutments 19 are disposed in this plane and remain at all times therein as the cam device moves with the work spindle 22. This construction and arrangement permits me to use what may be termed a single tooth gear of the involute type with no pressure angle and to effect, through the co-action of the cam device and abutments, a reciprocation of the slide 20 without transmitting pressure in any direction at an angle to the direction of movement of the slide 20.

By removably supporting the cam device 29 on the sleeve 25, it can be removed and a different sized cam device substituted according to the diameter of the gear to be ground; the form of construction herein disclosed being well adapted for grinding gears having diameters of twelve inches or less.

Each of the abutments 19 preferably comprises a boxlike chamber 19$^a$, a plate 19$^b$ slidably fitting the walls of the chamber 19$^a$ and carrying an arm 19$^c$, and an adjustment device 19$^d$. The arm 19$^c$ serves as the abutment element for the adjacent cam surface 29$^b$, the arm being preferably bifurcated to support a shaft on which a roller 19$^e$ is loosely mounted, such roller having engagement or contact with the adjacent cam surface of the cam device 29 in a plane tangential to the pitch circle of the gear A and eliminating friction as the cam device operates. The adjustment device 19$^d$ may comprise a screw mounted in the outer end wall of the chamber 19$^a$.

38 indicates means for clamping the plate 19$^b$ in its adjusted position, such means being preferably provided to insure rigidity and fixed relationship of the plates 19$^b$. The clamping means 38 preferably comprise an elongated slot 39 formed in the plate 19$^b$ and a cap screw 40 extending through the slot and engaging a screw threaded opening in the adjacent extension of the yoke member 16.

From the foregoing description it will be seen that the abutments may be adjusted relative to each other in a plane that is parallel to the direction of movements of the slide 20 and also in a direction at substantially right angles thereto, so that they may be disposed in the plane that is tangent to the pitch circle of any gear that is to be ground and permit contact of the cam device therewith in that plane, whereby the co-action between the cam device 29 and the abutments 19 will reciprocate the slide 20 without transmitting pressure at an angle to its direction of movement.

As both cam surfaces 29$^b$ are maintained in engagement with the abutments 19 and contact therewith at all times in the plane that is tangent to the pitch circle of the gear being ground, during oscillatory movement of the spindle 22, positive reciprocatory movements are imparted to the slide without resulting back-lash or lost motion thereof, so that accurate grinding operations upon the surfaces of the gear teeth result.

It will also be seen that my construction comprises relatively few parts and such parts are readily assembled and adjusted and provide ample room for the substitution of different sized cam devices in a ready manner.

To those skilled in the art of making apparatus of the class described, many alterations in construction and widely differing embodiments and applications of my invention will suggest themselves without departing from the spirit and scope thereof. My disclosures and description herein are purely illustrative and are not intended to be in any sense limiting.

What I claim is:

1. In apparatus of the class described, the combination of a pair of elements one of which slides relative to the other, a tool rotatably carried by the fixed element, a spindle carried by the slide element and supporting a work piece for operative engagement by said tool, and means for oscillating said spindle and moving said slide, whereby rolling movement is imparted to said work piece, said means including a pair of abutments fixed in spaced relationship carried by one of said elements and a cam device having cam-surfaces co-acting with said abutments carried by the other element.

2. An apparatus as defined in claim 1 in which the abutments are carried by the fixed element and the cam device has fixed relationship to and moves with said work supporting spindle.

3. An apparatus as defined in claim 1 in which the cam device is removable.

4. An apparatus as defined in claim 1 in which the cam device comprises a single tooth gear of the involute type.

5. In apparatus of the class described, the combination with a frame, and a tool rotatably supported thereby, a slide mounted to reciprocate on said frame, a work carrying spindle, a sleeve rotatably mounted on said slide and rotatably supporting said spindle, means for connecting said sleeve and spindle together, and means for oscillating said spindle and moving said slide, whereby rolling movement is imparted to the work, said means including a pair of abutments supported in spaced relationship on said frame, and a cam device having fixed relationship to said spindle and arranged to co-act with said abutments.

6. An apparatus as defined in claim 5 in which the abutments are adjustable.

7. An apparatus as defined in claim 5 in which the cam device is removably connected to said sleeve and the abutments are adjustable.

8. An apparatus as defined in claim 5 in which the abutments comprise anti-friction rollers with which the cam device engages.

9. In apparatus of the class described, the combination with a frame and a tool rotatably mounted thereon, a slide, a work carrying spindle on said slide, means for oscillating said spindle, and means for translating the applied power into reciprocating movement of said slide, said translating means comprising a pair of spaced abutments supported by said frame and a cam device movable with said spindle and co-acting with said abutments.

10. An apparatus as defined in claim 9 in which the abutments are adjustable.

11. An apparatus as defined in claim 9 in which the abutments are adjustable and the cam device is removable.

12. An apparatus as defined in claim 9 in which the abutments are adjustable at right angles to the direction of movement of the said slide and with respect to each other and the cam device is removable.

13. In apparatus of the class described, the combination of a pair of elements one of which slides relative to the other, a tool carried by the fixed element, a spindle carried by the slidable element and supporting a work piece for operative engagement by said tool, and means for oscillating said spindle and moving said slide, said means including an abutment carried by one of said elements and a cam device having cam surfaces co-acting with said abutment carried by the other element.

14. In apparatus of the class described, the combination of a pair of elements one of which slides relative to the other, a tool carried by the fixed element, a spindle carried by the slidable element and supporting a work piece for operative engagement by said tool, and means for oscillating said spindle and moving said slide, said means including an abutment carried by one of said elements and the cam device having cam surfaces co-acting with said abutment carried by the other element, the points of contact of said surfaces with said abutment being disposed at all times in a plane tangential to the pitch circle of the work piece to be ground.

15. In apparatus of the class described, the combination of a pair of elements one of which slides relative to the other, a tool carried by the fixed element, a spindle carried by the slidable element and supporting a work piece for operative engagement by said tool, and means for oscillating said spindle and moving said slide, said means including a pair of abutments fixed in spaced relationship in a plane that is tangential to the pitch circle of the work piece to be ground and carried by one of said elements and a cam device having cam surfaces contacting with said abutments in said plane of tangency carried by the other element.

16. In apparatus of the class described, the combination of a pair of elements one of which slides relative to the other, a tool carried by the fixed element, a work carrying spindle carried by the slidable element and supporting a work piece for operative engagement by said tool, and means for oscillating said spindle and moving said slide, said means including an abutment carried by said fixed element and a cam device having cam surfaces co-acting with said abutment carried by the slidable element, the points of contact of the cam surfaces with said abutment being disposed at all times in a plane tangential to the pitch circle of the work piece to be ground.

17. In apparatus in the class described, the combination of a pair of elements one of which slides relative to the other, a tool carried by the fixed element, a spindle carried by the slidable element and supporting a work piece for operative engagement by said tool, and means for oscillating said spindle and moving said slide, said means including a pair of abutments supported by said fixed element in spaced relationship in a plane that is tangential to the pitch circle of the work piece to be ground and a cam device carried by said slidable element and having cam surfaces co-acting with said abutments, the points of contact between said surfaces and the abutments being disposed at all times in said plane of tangency.

18. In apparatus in the class described, the combination with a frame and a tool carried thereby, of a slide mounted to reciprocate on said frame, a spindle carried by said slide and supporting a work piece for operative engagement by said tool, a yoke member fixed to said frame and carrying at its outer ends abutments disposed at opposite sides of said work spindle and in a plane that is tangential to the pitch circle of the work piece, means for oscillating said spindle, and a cam device movable with said spindle and having cam surfaces contacting with said abutments during movement of the spindle at points disposed in said plane.

19. An apparatus as defined in claim 18, in which the yoke member is adjustable at an angle to the plane of movement of the slide and the cam device is removable.

20. An apparatus as defined in claim 18, in which the abutments comprise anti-friction rollers.

21. In apparatus of the class described, the combination of a pair of elements one of which slides relative to the other, a tool carried by one of said elements, a spindle carried by the other of said elements and adapted to support a work piece for operative engagement by said tool, and means for oscillating said spindle and moving one of said elements, said means including an abutment carried by that element other than the one supporting said spindle and a cam device carried by said spindle and arranged to co-act with said abutment.

22. In apparatus of the class described, the combination of a pair of elements one of which slides relative to the other, a tool carried by one of said elements, a spindle carried by the other of said elements and adapted to support a work piece for operative engagement by said tool, and means for oscillating said spindle and moving one of said elements, said means including a pair of spaced abutments carried by that element other than the one supporting said spindle and a cam device carried by said spindle and arranged to co-act with said abutments.

In testimony whereof, I have hereunto signed my name.

CHARLES H. SCHURR.